Sept. 15, 1931.   L. C. RITNOUR   1,823,765
STEERING ROD BRAKE FOR AUTOMOBILES
Filed March 31, 1930   2 Sheets-Sheet 1
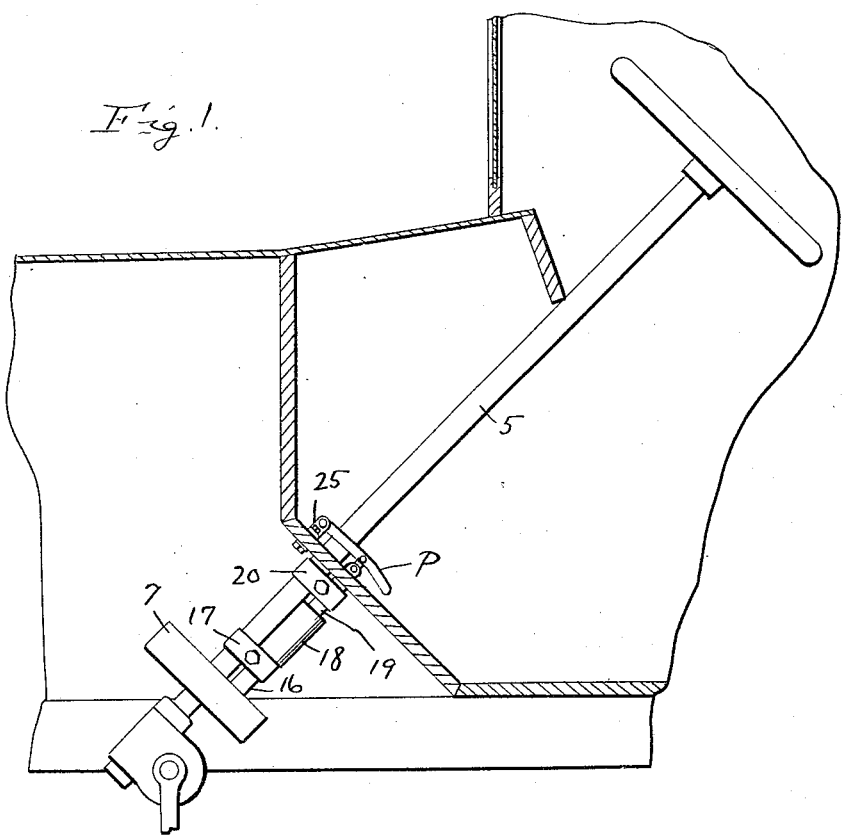
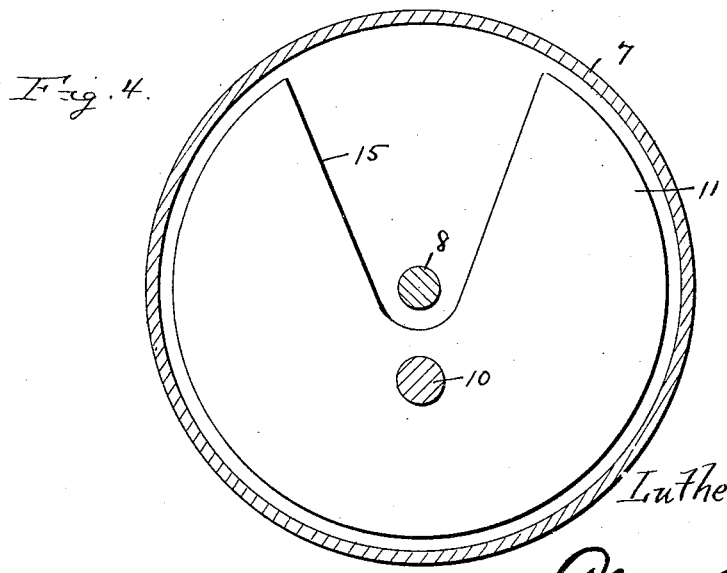
Inventor
Luther C. Ritnour
By Clarence A. O'Brien
Attorney

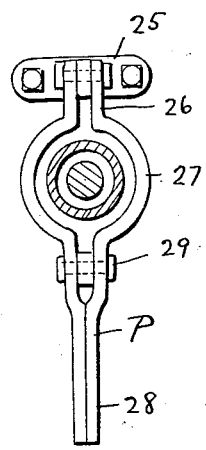
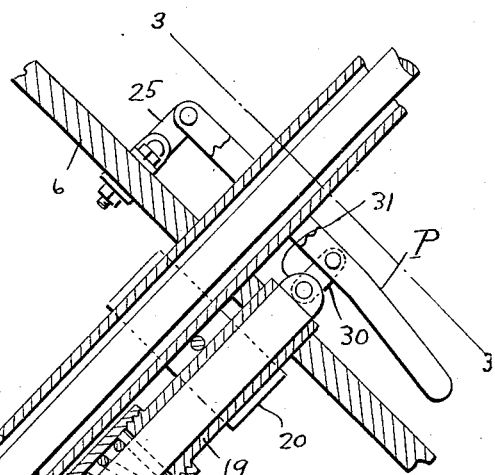
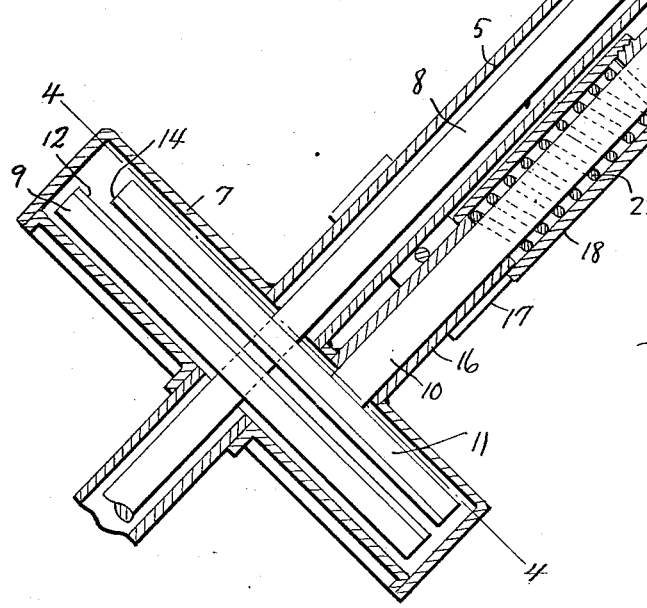

Patented Sept. 15, 1931

1,823,765

UNITED STATES PATENT OFFICE

LUTHER C. RITNOUR, OF NATCHEZ, MISSISSIPPI

STEERING ROD BRAKE FOR AUTOMOBILES

Application filed March 31, 1930. Serial No. 440,429.

The present invention relates to a steering rod brake so designed that the steering gear of an automobile in motion may be held by a foot pedal for short periods of time leaving the hands of the operator entirely free. The invention would be particularly useful on straight stretches of road in order that one may rest his arms for short periods of time when the car is running straight thereby eliminating danger of the car suddenly leaving the road, since the steering gear may be held with the foot operating the forementioned pedal.

An important object of the invention resides in the provision of a mechanism of this nature which is comparatively simple in its construction, easy to manipulate, thoroughly efficient and reliable in use and operation, compact and convenient in its arrangement of parts and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a fragmentary vertical longitudinal section through an automobile showing the steering column in elevation with my mechanism associated therewith, Figure 2 is a longitudinal section through the steering column and my improved mechanism, Figures 3 and 4 are detail transverse sections taken respectively on lines 3—3 and 4—4 of Figure 2.

Referring to the drawings in detail it will be seen that the numeral 5 denotes a steering column which projects through the floor board 6 in the usual well known manner.

A brake housing 7 is formed in the steering column 5 below the floor board 6. The numeral 8 denotes the steering shaft in the column 5. A disk 9 is fixed to this shaft 8 in the housing 7. A rod 10 is slidable through the top of the housing and has a fragmentary disk 11 on the bottom inner end thereof. The opposed faces of the disks 9 and 11 have brake lining 12 and 14 thereon.

The fragmentary disk 11 is formed with the notch 15 through which the shaft 8 extends. A sleeve 16 is disposed circumjacent the rod 10 and extends from the top of the housing 7 and a clamp 17 is disposed thereabout and the adjacent portion of the steering column 5. A sleeve 18 is partially disposed about the upper end of the sleeve 16 and has a sleeve 19 threaded in its upper end circumjacent the upper portion of the rod 10.

A clamp 20 is disposed about this sleeve 19 and about the adjacent portion of the steering column 5. The sleeve 19 extends through an opening in the floor board 6.

A coil spring 22 is disposed about the rod within the sleeve 18 abutting against the upper end of the sleeve 16 and against a pin 23 through a portion of the sleeve 10 normally holding the pin 23 against the lower end of the sleeve 19 with the two disks 9 and 11 in spaced relation to each other.

A bracket 25 is mounted on the floor board 6 above the steering column and has a foot pedal P pivotally engaged therewith. This foot pedal P comprises a pair of arms 26 having curved portions 27 about the steering column and the foot engaging portions alongside of each other being held together by a bolt 29. This bolt 29 also extends through a link 30 which is pivotally engaged with an ear 31 at the upper end of the rod 10.

From the above detailed description it will be readily apparent that a person driving an automobile along the road may place his foot on the pedal P and press the same downwardly so as to engage the brake shoe disk 11 with the brake shoe disk 9 and then take his hands off the steering wheel and the automobile will continue in the direction in which it has been set. The apparatus, of course, is useful to give the operator's hands and arms a rest and in numerous other circumstances will be found useful as will be apparent.

The present embodiment of the invention, of course, has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

An automobile steering column having a housing incorporated therein, a steering shaft in the column, a disk on the steering shaft within the housing, a second disk within the housing, a rod slidable through the housing and connected with the second disk, and means for operating the rod so that the second disk may be brought into braking engagement with the first disk.

In testimony whereof I affix my signature.

LUTHER C. RITNOUR.